(12) United States Patent
Liao

(10) Patent No.: US 11,874,820 B2
(45) Date of Patent: Jan. 16, 2024

(54) CONSENSUS METHOD, APPARATUS, AND SYSTEM FOR BLOCKCHAIN BASED ON BYZANTINE FAULT TOLERANCE ALGORITHM

(71) Applicant: Alipay (Hangzhou) Information Technology Co., Ltd., Zhejiang (CN)

(72) Inventor: Xiaojun Liao, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/354,101

(22) Filed: Jun. 22, 2021

(65) Prior Publication Data

US 2022/0004536 A1 Jan. 6, 2022

(30) Foreign Application Priority Data

Jul. 3, 2020 (CN) .......................... 202010630539.0

(51) Int. Cl.
*G06F 16/23* (2019.01)
*H04L 9/32* (2006.01)
*G06Q 20/38* (2012.01)
*H04L 9/00* (2022.01)

(52) U.S. Cl.
CPC ...... *G06F 16/2365* (2019.01); *G06F 16/2379* (2019.01); *H04L 9/3239* (2013.01); *G06Q 20/389* (2013.01); *G06Q 20/3827* (2013.01); *H04L 9/50* (2022.05)

(58) Field of Classification Search
CPC .... G06Q 20/00–425; G06F 16/00–986; H04L 9/00–38
See application file for complete search history.

(56) References Cited

U.S. PATENT DOCUMENTS

2018/0083786 A1* 3/2018 Dierks ................. G06F 21/602
2021/0073212 A1* 3/2021 Conley .................. G06F 16/27

FOREIGN PATENT DOCUMENTS

| CN | 106850536 A | 6/2017 |
| CN | 109766673 A | 5/2019 |
| CN | 110708171 A | 1/2020 |

(Continued)

OTHER PUBLICATIONS

First Office Action of Chinese Application No. 202010630539.0, dated Aug. 17, 2020.

(Continued)

*Primary Examiner* — Mohammad A. Nilforoush
(74) *Attorney, Agent, or Firm* — Finnegan, Henderson, Farabow, Garrett & Dunner, LLP

(57) ABSTRACT

A consensus method for a blockchain based on a Byzantine fault tolerance algorithm, includes: initiating, by a first consensus node of a consortium blockchain, a consensus proposal comprising a first proposal digest generated based on a first last block hash maintained by the first consensus node; in response to the consensus proposal, generating, by a second consensus node of the consortium blockchain, a second proposal digest based on a second last block hash maintained by the second consensus node; and not participating in, by the second consensus node, a consensus on the consensus proposal if it is detected that the first proposal digest does not match the second proposal digest.

6 Claims, 9 Drawing Sheets

(56) References Cited

FOREIGN PATENT DOCUMENTS

WO    WO 2020/004252 A1    1/2020

OTHER PUBLICATIONS

Extended European Search Report in European Application No. 21181533.7, dated Nov. 26, 2021.
Khan, N., "FAST: A MapReduce Consensus for High Performance Blockchains", BlockSys '18, Nov. 4, 2018, Shenzhen, China, pp. 1-6.
Zeng, C., et al., "Pinocchio: A Blockchain-Based Algorithm for Sensor Fault Tolerance in Low Trust Environment", 2020 IEEE International Parallel and Distributed Processing Symposium Workshops (IPDPSW), May 18, 2020, pp. 416-425.

\* cited by examiner

A first consensus node of a consortium blockchain initiates a consensus proposal including a first proposal digest generated based on a first last block hash maintained by the first consensus node, wherein the first last block hash is hash values of the closest N blocks previous to the latest block in a distributed ledger maintained by the first consensus node, and N is a positive integer ~ 302

CONSENSUS METHOD, APPARATUS, AND SYSTEM FOR BLOCKCHAIN BASED ON BYZANTINE FAULT TOLERANCE ALGORITHM

CROSS-REFERENCE TO RELATED APPLICATIONS

The present application is based upon and claims priority to Chinese Patent Application No. 202010630539.0, filed on Jul. 3, 2020, the entire content of which is incorporated herein by reference.

TECHNICAL FIELD

The present application relates to the field of computer technologies, and in particular, to a consensus method, apparatus, and system for a blockchain based on a Byzantine fault tolerance algorithm.

BACKGROUND

A consensus protocol is configured to allow nodes in a blockchain, which are distributed around the world, to form a consensus. In an existing blockchain system, a packaged transaction set may be copied, through a consensus protocol, to other nodes in a network that participate in the consensus to ensure that most nodes have consistent data copies. Each consensus node performs transaction execution based on the consistent transaction set and generates a new block. After the new block is generated, a consensus on a next transaction set is continued and the above process is repeated. The consensus protocol can ensure that most nodes have the same transaction set after the consensus ends, but it may not guarantee that a consistent block is generated based on input of the same transaction set.

Therefore, a more reliable solution is needed.

SUMMARY

In a first aspect, a consensus method for a blockchain based on a Byzantine fault tolerance algorithm, includes: initiating, by a first consensus node of a consortium blockchain, a consensus proposal including a first proposal digest generated based on a first last block hash maintained by the first consensus node; in response to the consensus proposal, generating, by a second consensus node of the consortium blockchain, a second proposal digest based on a second last block hash maintained by the second consensus node; and not participating in, by the second consensus node, a consensus on the consensus proposal if it is detected that the first proposal digest does not match the second proposal digest, wherein the first last block hash is one or more hash values of one or more closest blocks previous to a latest block in a distributed ledger maintained by the first consensus node, and the second last block hash is one or more hash values of one or more closest blocks previous to a latest block in a distributed ledger maintained by the second consensus node.

In a second aspect, a consensus method for a blockchain based on a Byzantine fault tolerance algorithm, includes: initiating, by a first consensus node of a consortium blockchain, a consensus proposal including a first proposal digest generated based on a first last block hash maintained by the first consensus node; in response to the consensus proposal, generating, by a second consensus node of the consortium blockchain, a second proposal digest based on a second last block hash maintained by the second consensus node; and participating in, by the second consensus node, a consensus on the consensus proposal if it is detected that the first proposal digest matches the second proposal digest, wherein the first last block hash is one or more hash values of one or more closest blocks previous to a latest block in a distributed ledger maintained by the first consensus node, and the second last block hash is one or more hash values of one or more closest blocks previous to a latest block in a distributed ledger maintained by the second consensus node.

In a third aspect, an electronic device for a blockchain based on a Byzantine fault tolerance algorithm is provided. The electronic device operating as a second consensus node of a consortium blockchain and includes: a processor; and a memory storing instructions executable by the processor, wherein the processor is configured to: in response to a consensus proposal initiated by a first consensus node of the consortium blockchain, generate a second proposal digest based on a second last block hash maintained by the second consensus node, the consensus proposal comprising a first proposal digest generated based on a first last block hash maintained by the first consensus node; and participate in a consensus on the consensus proposal if it is detected that the first proposal digest matches the second proposal digest, wherein the first last block hash is one or more hash values of one or more closest blocks previous to a latest block in a distributed ledger maintained by the first consensus node, and the second last block hash is one or more hash values of one or more closest blocks previous to a latest block in a distributed ledger maintained by the second consensus node.

According to embodiments of the present specification, a function of reaching a consensus on a last block hash is introduced into a consensus protocol based on a Byzantine fault tolerance algorithm, so that a consensus node can judge whether itself is forked or a node that initiates the consensus is forked, and decide whether to participate in the consensus, thereby ensuring that nodes participating in the consensus reach a consensus based on a consistent last block.

BRIEF DESCRIPTION OF THE DRAWINGS

The accompanying drawings, which are incorporated in and constitute a part of this specification, illustrate embodiments and, together with the description, serve to explain the principles of the specification.

FIG. 3 is a flowchart of a consensus method for a blockchain based on a Byzantine fault tolerance algorithm according to an embodiment.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples of rather than all the embodiments of the present application.

As described in the Background, the consensus protocol can ensure that most nodes have the same transaction set after the consensus ends, but it may not guarantee that nodes can generate a consistent block based on input of the same transaction set after execution of the transaction. For example, in a new round of consensus, if the last block is forked, neither a forked node nor an unforked node can judge in time whether it is forked, and may continue to participate in the consensus, which affects the consistency of blocks generated by the nodes. Based on this, the present specification provides a consensus method for a blockchain based on a Byzantine fault tolerance algorithm, in which a function of reaching a consensus on a last block hash is used in a consensus protocol, so that a consensus node can judge in time whether itself is forked or a node that initiates the consensus is forked, and decide whether to participate in the consensus, thereby ensuring that nodes participating in the consensus reach a consensus based on a consistent last block.

Figure 1:
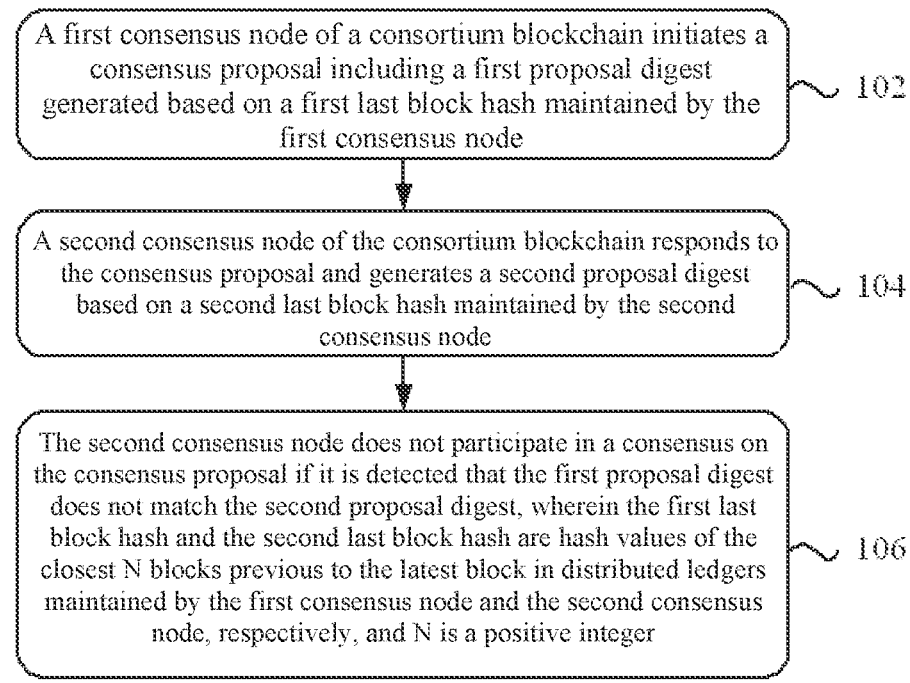
FIG. 1 is a flowchart of a consensus method for a blockchain based on a Byzantine fault tolerance algorithm according to an embodiment.

FIG. 1 is a flowchart of a consensus method for a blockchain based on a Byzantine fault tolerance algorithm according to an embodiment. Referring to FIG. 1, the method may include the following steps.

In step 102, a first consensus node of a consortium blockchain initiates a consensus proposal including a first proposal digest generated based on a first last block hash maintained by the first consensus node.

In step 104, a second consensus node of the consortium blockchain responds to the consensus proposal and generates a second proposal digest based on a second last block hash maintained by the second consensus node.

The first consensus node may be a node that initiates the consensus proposal in the consortium blockchain, and the second consensus node may be a node that may participate in the consensus in the consortium blockchain. For example, in a consortium blockchain with a master-slave relationship, the first consensus node is a master node, and the second consensus node is a slave node.

In step 106, the second consensus node does not participate in the consensus on the consensus proposal if it is detected that the first proposal digest does not match the second proposal digest.

The first last block hash and the second last block hash are hash values of the closest N blocks previous to the latest block in distributed ledgers maintained by the first consensus node and the second consensus node, respectively, and N is a positive integer.

In an embodiment, a last block hash may be a hash value of a previous block of the latest block. Accordingly, the first last block hash is a hash value of a previous block of the latest block in the distributed ledger maintained by the first consensus node; and the second last block hash is a hash value of a previous block of the latest block in the distributed ledger maintained by the second consensus node.

It should be understood that the last block hash may also be implemented in other manners, which is not limited in the embodiment of the present application. Based on this, a previous block of the latest block is introduced into the consensus protocol, and based on the previous block of the latest block being adjacent to the latest block, a fork between the two can be avoided. In addition, verifying the consistency of the hash value of the previous block of the latest block can ensure the consistency of last blocks, and therefore, the amount of data required for matching can be reduced.

In an embodiment, under a data structure of an existing consensus proposal, a calculation method of the proposal digest is modified, and a last block hash is added to serve as a calculation element of the proposal digest together with a transaction hash. The first proposal digest is generated based on the first last block hash and a first transaction hash of a transaction set needing to be proposed by the first consensus node; similarly, the second proposal digest may also be generated based on the second last block hash and a second transaction hash of the transaction set determined by the second consensus node.

For example, the first consensus node reads a hash value of a previous block from a block header of the latest block in the distributed ledger maintained by this node, the hash value being recorded as a first last block hash; then generates the first proposal digest based on the first last block hash and a transaction set needing to be proposed, and adds the first proposal digest and the transaction set needing to be proposed to the consensus proposal.

After receiving the consensus proposal, the second consensus node reads a hash value of a previous block from a block header of the latest block in the distributed ledger maintained by this node, the hash value being recorded as a second last block hash; then re-generates, based on the second last block hash and the transaction set needing to be proposed, a proposal digest which is recorded as a second proposal digest, and detects whether the first proposal digest matches the second proposal digest, if yes, participates in a consensus on the transaction set needing to be proposed, and if it is detected that the first proposal digest does not match the second proposal digest, does not participate in a consensus on the consensus proposal.

In the embodiment, the method for introducing the last block hash may be a calculation method for modifying a proposal digest Digest in a Preprepare message (that is, proposal message) of a Byzantine Fault Tolerance pbft consensus algorithm as agreed in a consensus protocol, in which the last block hash is introduced therein as a calculation variable to generate a new proposal digest. Specific examples may be as follows.

In S1, a proposal digest Digest is calculated.

The first consensus node determines a first transaction hash of the transaction set; and a first proposal digest is generated based on the first transaction hash and the first last block hash. A calculation logic thereof may include:

struct ConsensusDigest {
Digest tx_root_hash;
Digest last_block_hash;
};

In S2, a Preprepare message is calculated.

Based on the first proposal digest and the transaction set, a Preprepare message is generated and broadcast to initiate a consensus proposal. A message format of the Preprepare message may be:

```
struct PreprepareMessage {
    View v;
    Seq seq;
    Digenst d; // proposal digest
    Batch batch; // set of several transactions
};
```

Similarly, after receiving the consensus proposal of the first consensus node, the second consensus node may generate, according to the above methods for calculating the proposal digest Digest and the Preprepare message, a second proposal digest based on a transaction hash of a transaction set and the second last block hash. Finally, the re-generated second proposal digest is compared with the first proposal digest in the consensus proposal, and if it is detected that the second proposal digest does not match the first proposal digest, it is determined that the first last block hash does not match the second last block hash. In other words, the last block of the second consensus node is inconsistent with the last block of the first consensus node, so the second consensus node does not participate in this consensus.

The first consensus node and the second consensus node may take a root hash of a Merkel tree as a root hash of the transaction set by calculating the Merkel tree of the transaction set. In other words, the first transaction hash may be a root hash value of the Merkel tree corresponding to the transaction set determined by the first consensus node; and the second transaction hash may be a root hash value of the Merkel tree corresponding to the transaction set in the consensus proposal determined by the second consensus node.

In an embodiment, under a data structure of an existing consensus proposal, a calculation method of the proposal digest is modified, and the last block hash is used as a new calculation element to replace a current calculation element of the proposal digest. The first proposal digest is generated based on the first last block hash; and similarly, the second proposal digest may also be generated based on the second last block hash.

For example, the first consensus node reads a hash value of a previous block from a block header of the latest block in the distributed ledger maintained by this node, the hash value being recorded as a first last block hash; then generates the first proposal digest based on the first last block hash, and adds the first proposal digest and the transaction set needing to be proposed to the consensus proposal.

After receiving the consensus proposal, the second consensus node reads a hash value of a previous block from a block header of the latest block in the distributed ledger maintained by this node, the hash value being recorded as a second last block hash; then re-generates, based on the second last block hash, a proposal digest which is recorded as a second proposal digest, and detects whether the first proposal digest matches the second proposal digest, if yes, participates in a consensus on the transaction set needing to be proposed, and if it is detected that the first proposal digest does not match the second proposal digest, does not participate in a consensus on the consensus proposal.

Two example embodiments are described above for the introduction of the last block hash herein. It should be understood that the introduction of the last block hash may also be implemented in other manners, which is not limited in the embodiment of the present application. In the embodiment of the present specification, the calculation method of the proposal digest is modified, and the last block hash is used as a variable for calculating the proposal digest.

In addition, for the above first embodiment of the introduction of the last block hash, considering that a transaction set corresponding to the first transaction hash used to calculate the proposal digest may be inconsistent with a transaction set included in the consensus proposal, a calculation method of the proposal digest may be used, as follows.

For a first proposal digest, the first consensus node first determines a transaction set (recorded as a first transaction set) and calculates a hash value of the first transaction set (recorded as a first transaction hash); and then generates the first proposal digest based on the first last block hash and the first transaction hash of the transaction set determined by the first consensus node.

Under normal circumstances, the first consensus node may place the first transaction set in the consensus proposal and broadcast it to other nodes. The second consensus node may parse the consensus proposal and learn that an object of the consensus proposal is the first transaction set. However, due to some abnormal circumstances, the transaction set included in the consensus proposal may not be the first transaction set, but another transaction set (recorded as a second transaction set), and an object of the consensus proposal determined by the second consensus node is the second transaction set. Therefore, if the second consensus node uses the first transaction hash calculated by the first consensus node to calculate a second proposal digest, the second transaction set may be written into the block, resulting in that a transaction set expected to be proposed by the first consensus node is inconsistent with a transaction set actually proposed.

In view of this situation, for the second proposal digest, the second consensus node first determines the transaction set needing to be proposed included in the consensus proposal, then recalculates a second transaction hash of the transaction set in the consensus proposal, and generates the second proposal digest based on the second transaction hash of the transaction set in the consensus proposal and the second last block hash.

It should be understood that the calculation method of the proposal digest may also be implemented in other manners, which is not limited in the embodiment of the present application. In the embodiment of the present specification, the proposal digest is calculated by the first consensus node and the second consensus node respectively for a transaction set needing to be proposed determined respectively, so as to avoid the inconsistency between the transaction set expected to be proposed by the first consensus node and the transaction set actually proposed.

Further, if the transaction set expected to be proposed by the first consensus node is inconsistent with the transaction set actually proposed, it indicates that this consensus proposal is abnormal, and the node does not need to participate in this consensus. Therefore, before step 104 of generating the second proposal digest is performed, the consensus protocol may also agree to write the transaction hashes of the proposed transaction sets into the consensus proposal or into the proposal digest, and the step of transaction hash matching is first performed to verify the consistency of the transaction set in advance.

The following takes writing the transaction hash into the proposal digest as an example to illustrate the step of transaction hash matching.

The first consensus node writes the first transaction hash into the first proposal digest after calculating the first proposal digest. The second consensus node calculates the second transaction hash based on the calculation method of the proposal digest, and matches the second transaction hash with the first transaction hash in the first proposal digest. If it is detected that the first transaction hash does not match the second transaction hash, it indicates that the transaction set expected to be proposed by the first consensus node is inconsistent with the transaction set actually proposed, and the second consensus node does not participate in a consensus on the consensus proposal. If it is detected that the first transaction hash matches the second transaction hash, it indicates that the transaction set expected to be proposed by the first consensus node is consistent with the transaction set actually proposed, and the step of generating the second proposal digest may be continued.

It should be understood that the step of transaction hash matching may also be implemented in other manners, which is not limited in the embodiment of the present application. In the embodiment of the present specification, the first transaction hash calculated by the first consensus node is written into the first proposal digest, so that before the second consensus node performs matching in the dimension of the proposal digest, it is first judged, for the matching in the dimension of the transaction hashes of the transaction sets and based on a matching result, whether the transaction set expected to be proposed by the first consensus node is consistent with the transaction set actually proposed, and it is then judged whether there is a need to further perform matching in the dimension of the proposal digest, so as to avoid a waste of resources caused by useless matching of the proposal digest.

In the above embodiments of the present specification, a function of reaching a consensus on a last block hash is introduced into a consensus protocol based on a Byzantine fault tolerance algorithm, so that a consensus node can judge whether itself is forked or a node that initiates the consensus is forked, and decide whether to participate in the consensus, thereby ensuring that nodes participating in the consensus reach a consensus based on a consistent last block.

Figure 2:
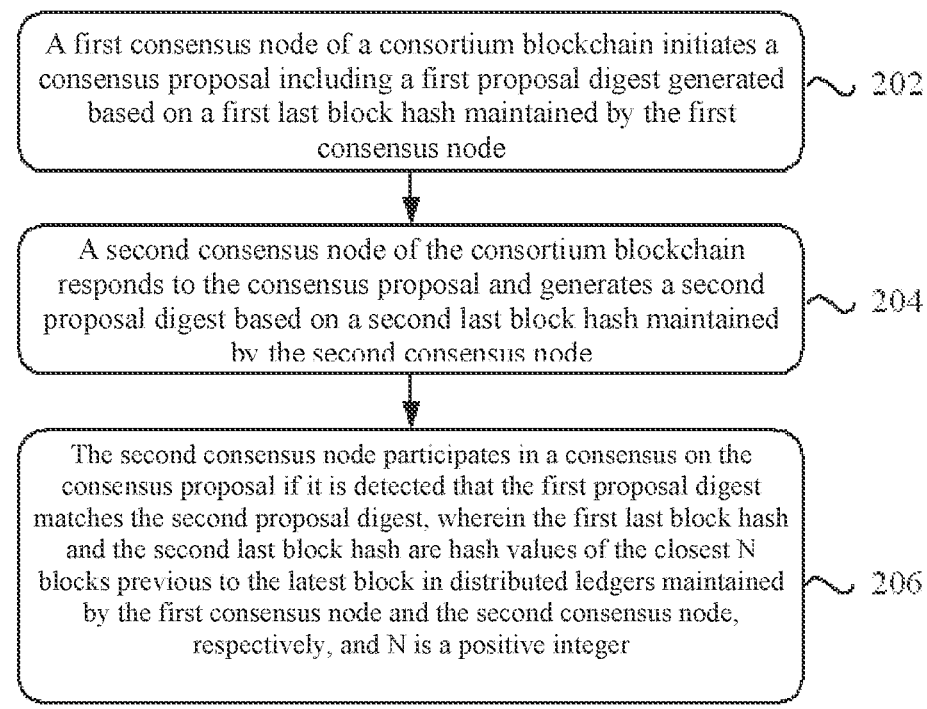
FIG. 2 is a flowchart of a consensus method for a blockchain based on a Byzantine fault tolerance algorithm according to an embodiment.

FIG. 2 is a flowchart of a consensus method for a blockchain based on a Byzantine fault tolerance algorithm according to an embodiment. Referring to FIG. 2, the method may include the following steps.

In step 202, a first consensus node of a consortium blockchain initiates a consensus proposal including a first proposal digest generated based on a first last block hash maintained by the first consensus node.

In step 204, a second consensus node of the consortium blockchain responds to the consensus proposal and generates a second proposal digest based on a second last block hash maintained by the second consensus node.

In step 206, the second consensus node participates in a consensus on the consensus proposal if it is detected that the first proposal digest matches the second proposal digest.

The first last block hash and the second last block hash are hash values of the closest N blocks previous to the latest block in distributed ledgers maintained by the first consensus node and the second consensus node, respectively, and N is a positive integer.

In an embodiment, the first last block hash is a hash value of a previous block of the latest block in the distributed ledger maintained by the first consensus node; and the second last block hash is a hash value of a previous block of the latest block in the distributed ledger maintained by the second consensus node.

In an embodiment, the first proposal digest is generated based on the first last block hash and a first transaction hash of a transaction set needing to be proposed by the first consensus node.

In an embodiment, the consensus proposal further includes the transaction set needing to be proposed, and step 204 further includes: generating the second proposal digest based on a second transaction hash of the transaction set in the consensus proposal and the second last block hash.

In an embodiment, the first transaction hash is a root hash value of a Merkel tree corresponding to the transaction set determined by the first consensus node; and the second transaction hash is a root hash value of a Merkel tree corresponding to a transaction set that is in the consensus proposal and determined by the second consensus node.

In an embodiment, the first proposal digest carries the first transaction hash, and before generating a second proposal digest, the method further includes: not participating in the consensus on the consensus proposal if it is detected that the first transaction hash does not match the second transaction hash; and continuing the step of generating the second proposal digest if it is detected that the first transaction hash matches the second transaction hash.

In an embodiment, the method further includes: not participating in, by the second consensus node, the consensus on the consensus proposal if it is detected that the first proposal digest does not match the second proposal digest.

In the embodiments of the present specification, a function of reaching a consensus on a last block hash is introduced into a consensus protocol based on a Byzantine fault tolerance algorithm, so that a consensus node can judge whether itself is forked or a node that initiates the consensus is forked, and decide whether to participate in the consensus, thereby ensuring that nodes participating in the consensus reach a consensus based on a consistent last block. In addition, the embodiments illustrated in connection with FIG. 2 correspond to the embodiments illustrated in connection with FIG. 1, and the implementations of the steps are also correspondingly similar.

FIG. 3 is a flowchart of a consensus method for a blockchain based on a Byzantine fault tolerance algorithm according to an embodiment. The method may be performed by a first consensus node that initiates a consensus proposal in a consortium blockchain. Referring to FIG. 3, the method may include the following step.

In step 302, a first consensus node of a consortium blockchain initiates a consensus proposal including a first proposal digest generated based on a first last block hash maintained by the first consensus node.

The first last block hash is hash values of the closest N blocks previous to the latest block in a distributed ledger maintained by the first consensus node, and N is a positive integer.

An implementation of step 302 may be as follows: under a data structure of an existing consensus proposal, a calculation method of the proposal digest is modified, and a last block hash is added to serve as a calculation element of the proposal digest together with a transaction hash. The implementation may include the following steps.

In step S1, a transaction set needing to be proposed is determined. For example, a request initiated by a client is placed in a transaction pool. After confirming that a transaction succeeds in verification, the first consensus node captures a certain number of transactions from the transaction pool, the certain number of transactions being recorded as a transaction set.

In step S2, a first last block hash maintained by the first consensus node is determined, the first last block hash is hash values of the closest N blocks previous to the latest block in a distributed ledger maintained by the first consensus node, and N is a positive integer.

Figure 4:
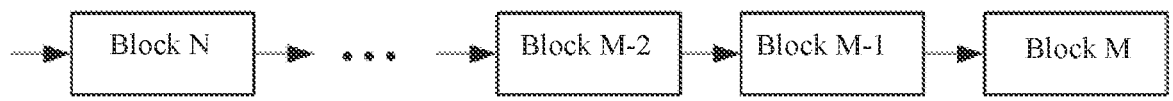
FIG. 4 is a schematic diagram of a distributed ledger maintained by a first consensus node according to an embodiment.

For example, referring to FIG. 4, the distributed ledger maintained by the first consensus node includes block 1 (not shown), . . . , block N, . . . , block M-2, block M-1, and block M, where block M is the latest block generated in the consortium blockchain, that is, the latest block maintained by the first consensus node. Correspondingly, the first last block hash may be one or more hash values of the closest one or more blocks before block M.

Correspondingly, an implementation of step S2 may include: determining a hash value of a previous block of the latest block maintained by the first consensus node; and using the hash value of the previous block as the first last block hash. That is, in this implementation, a hash value of a block closest to the latest block, for example, previous block M-1 of the latest block M in FIG. 4, is selected, and the hash value of block M-1 is used as the first last block hash. In other implementations of step S2, hashes of a plurality of previous closest blocks may also be used, for example, hashes of all blocks previous to the latest block are used, which is not limited herein.

Figure 5:
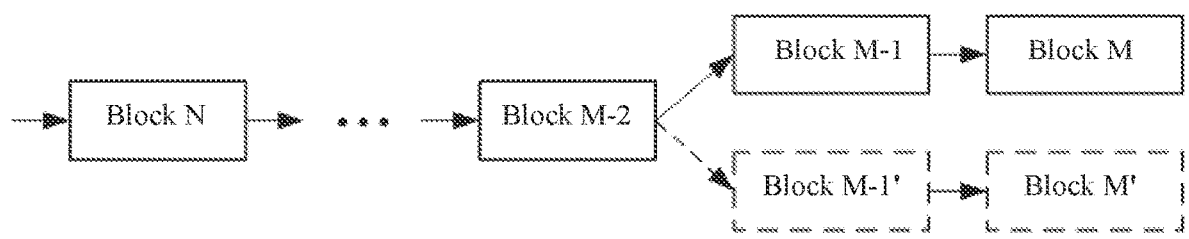
FIG. 5 is a schematic diagram of a distributed ledger maintained by a second consensus node according to an embodiment.

The last block hash may be used for judging whether a node is forked, because a forked node and an unforked node have different last block hashes. Referring to FIG. 5, the last block hashes of the unforked node correspond to block 1 to block M-2 and block M-1, and the last block hashes of the forked node correspond to block 1 to block M-2 and block M-1'. For example, a hash value of a previous block recorded in a block header of block M is a hash value of block M-1, and a hash value of a previous block recorded in a block header of block M' is a hash value of the block M-1'; the two are different. Therefore, it can be used as a basis for judging whether a node is forked or not.

It should be understood that step S2 may also be implemented in other manners, which is not limited in the embodiment of the present application. In the embodiment of the present specification, based on the characteristic that last block hashes maintained by the forked node and the unforked node are different, one or more hash values of one or more closest blocks previous to the latest block maintained by the nodes are used as the last block hashes, so that it can be judged whether the present node or a node initiating a consensus is forked.

In step S3, based on the transaction set and the first last block hash, a proposal digest is generated and a consensus proposal is initiated. An implementation thereof may be: determining a first transaction hash of the transaction set; generating a proposal digest based on the first transaction hash and the first last block hash; and generating, based on the proposal digest and the transaction set, a proposal message and broadcasting the proposal message to initiate a consensus proposal.

A specific calculation method, a specific data structure, and a specific message format of the proposal digest and the proposal message may be determined to adapt to a type of the consortium blockchain and a type of a consensus algorithm used, which are not limited herein. For example, when a consensus master node of the consortium blockchain initiates a consensus proposal, a proposal message generally includes a transaction that succeeds in service verification of the consensus master node. Based on the embodiment of the present specification, the calculation method of the proposal digest may be modified to introduce the last block hash into a calculation formula of the proposal digest.

Another implementation of step 302 may be as follows: under a data structure of an existing consensus proposal, a calculation method of the proposal digest is modified, and the last block hash is used as a new calculation element to replace a current calculation element of the proposal digest. The implementation may include the following steps.

In step S1' a transaction set needing to be proposed is determined.

In step S2', a first last block hash maintained by the first consensus node is determined, the first last block hash is hash values of the closest N blocks previous to the latest block in a distributed ledger maintained by the first consensus node, and N is a positive integer.

For step S1' and step S2', they respectively correspond to step S1 and step S2 of the previous implementation, and have correspondingly similar implementations.

In step S3', based on the first last block hash, a proposal digest is generated and a consensus proposal is initiated.

For step S3', its implementation has been described in detail in the embodiment corresponding to FIG. 1.

Two specific implementations of step 302 are described above as examples. It should be understood that step 302 may also be implemented in other manners, which is not limited in the embodiment of the present application. In the embodiment of the present specification, the calculation method of the proposal digest is modified, and the last block hash is used as a variable for calculating the proposal digest.

In an embodiment, the first last block hash is a hash value of a previous block of the latest block in the distributed ledger maintained by the first consensus node.

In an embodiment, the first transaction hash is a root hash value of a Merkel tree corresponding to the transaction set determined by the first consensus node.

In an embodiment, the first consensus node may also write the first transaction hash in the first proposal digest for the second consensus node to verify whether the transaction set corresponding to the first transaction hash is consistent with the transaction set targeted by the consensus proposal.

In the embodiments of the present specification, a function of reaching a consensus on a last block hash is introduced into a consensus protocol, so that a consensus node can judge in time whether itself is forked or a node that initiates the consensus is forked, and decide whether to participate in the consensus, thereby ensuring that nodes participating in the consensus reach a consensus based on a consistent last block, and avoiding aggravating block forking. Moreover, the embodiments illustrated in connection with FIGS. 3-5 correspond to the embodiments illustrated in connection with FIG. 1.

Figure 6:
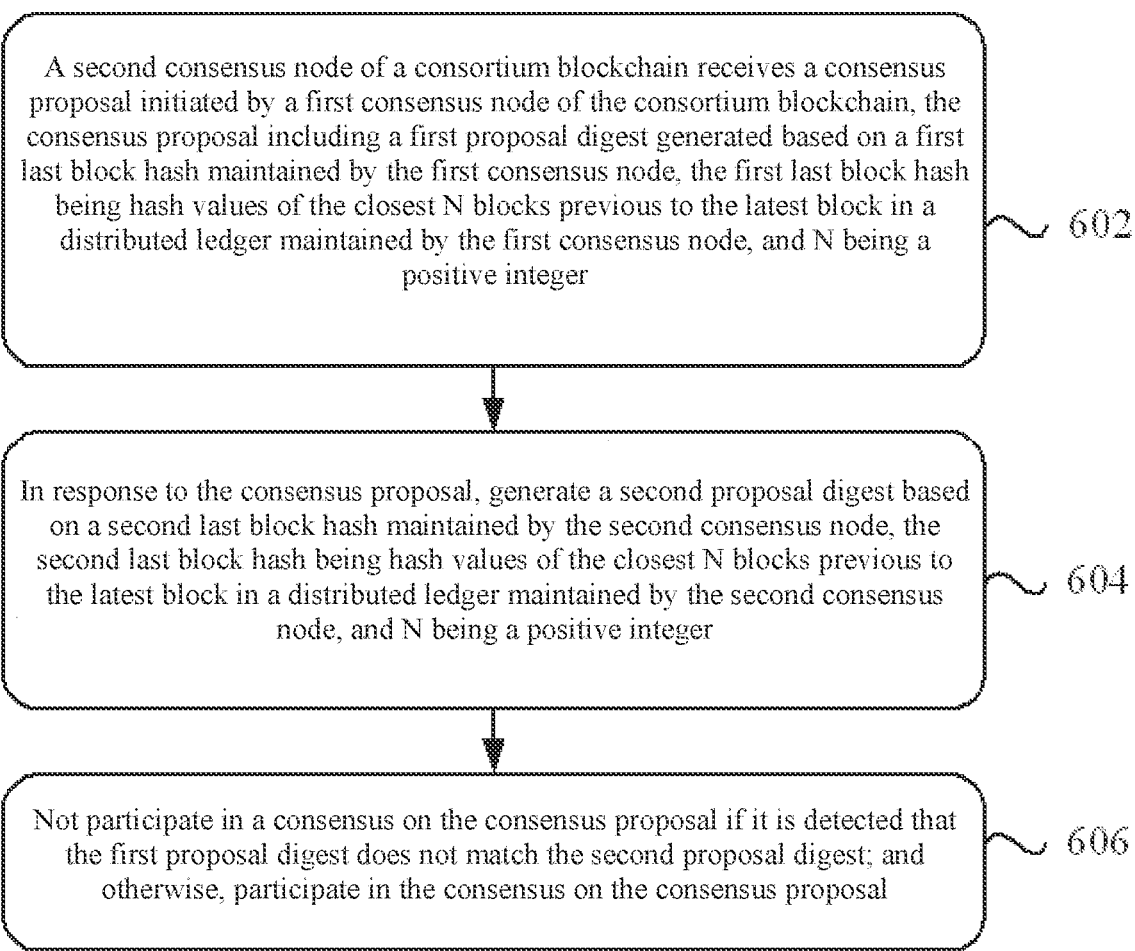
FIG. 6 is a flowchart of a consensus method for a blockchain based on a Byzantine fault tolerance algorithm according to an embodiment.

FIG. 6 is a flowchart of a consensus method for a blockchain based on a Byzantine fault tolerance algorithm according to an embodiment. The method may be performed by a second consensus node of a consortium blockchain. Referring to FIG. 6, the method may include the following steps.

In step 602, a second consensus node of a consortium blockchain receives a consensus proposal initiated by a first consensus node of the consortium blockchain, the consensus proposal including a first proposal digest generated based on a first last block hash maintained by the first consensus node, the first last block hash being hash values of the closest N blocks previous to the latest block in a distributed ledger maintained by the first consensus node, and N being a positive integer.

In step 604, in response to the consensus proposal, a second proposal digest is generated based on a second last block hash maintained by the second consensus node, the second last block hash being hash values of the closest N blocks previous to the latest block in a distributed ledger maintained by the second consensus node, and N being a positive integer.

For example, referring to FIG. 5, blocks in the consortium blockchain maintained by the second consensus node include block 1 (not shown), . . . , block M-2, block M-1, and block M, where block M is the latest block generated in the consortium blockchain, that is, the latest block maintained by the second consensus node. Correspondingly, the second last block hash may be a hash value or hash values of the closest one or more blocks previous to block M.

Similar to step 302 in FIG. 3, step 604 also has at least two implementations.

A first implementation of step 604 may be as follows: under a data structure of an existing consensus proposal, a calculation method of the proposal digest is modified, and a last block hash is added to serve as a calculation element of the proposal digest together with a transaction hash.

For example, after the consensus proposal is received, a hash value of a previous block of the latest block maintained by the second consensus node is determined; and the hash value of the previous block is used as the second last block hash. That is, in this implementation, a hash value of one of a plurality of last blocks that is closest to the latest block, for example, previous block M-1 of the latest block M in FIG. 5, is selected, and the hash value of block M-1 is taken as the second last block hash.

In other implementations of step 604, hashes of a plurality of last blocks may also be used, for example, hashes of all blocks previous to the latest block are used, which is not limited herein. However, it should be noted that as agreed in the consensus protocol, the last block selected by the first consensus node and the last block selected by the second consensus node correspond to each other, e.g., the selected last blocks being equal in number, identifiers of the selected last blocks in respective distributed ledgers being correspondingly identical, and so on. For example, the first consensus node selects all blocks previous to the latest block, and the second consensus node may also correspondingly select all blocks previous to the latest block. In another example, the first consensus node selects only a previous block of the latest block, and the second consensus node may also correspondingly select a previous block of the latest block.

A second implementation of step 604 may be as follows: under a data structure of an existing consensus proposal, a calculation method of the proposal digest is modified, and the last block hash is used as a new calculation element to replace a current calculation element of the proposal digest.

For example, after receiving the consensus proposal, the second consensus node reads a hash value of a previous block from a block header of the latest block in the distributed ledger maintained by this node, the hash value being recorded as a second last block hash; then re-generates a proposal digest based on the second last block hash, the proposal digest being recorded as a second proposal digest.

Two example implementations of step 604 are described above. It should be understood that step 604 may also be implemented in other manners, which is not limited in the embodiment of the present application. In the embodiment of the present specification, the calculation method of the proposal digest is modified, and the last block hash is used as a variable for calculating the proposal digest.

In step 606, a consensus on the consensus proposal is not participated in if it is detected that the first proposal digest does not match the second proposal digest; and otherwise, the consensus on the consensus proposal is participated in.

For example, the second consensus node parses the first proposal digest and the transaction set needing to be proposed from the proposal message; then, recalculates a second transaction hash of the transaction set, and generates a second proposal digest based on the second transaction hash and the second last block hash maintained by the second consensus node; then, detects whether the first proposal digest matches the second proposal digest. If they do not match each other, the second consensus node determines that one of the first consensus node and the second consensus node is a forked node and the other is an unforked node, and refuses to participate in this consensus; and otherwise, determines that last block results of the two are the same and participates in this consensus.

In an embodiment, the second last block hash is a hash value of a previous block of the latest block in a distributed ledger maintained by the second consensus node.

In an embodiment, the consensus proposal further includes the transaction set needing to be proposed, and the second proposal digest is generated based on the second transaction hash of the transaction set in the consensus proposal and the second last block hash.

In an embodiment, the second transaction hash is a root hash value of a Merkel tree corresponding to a transaction set that is in the consensus proposal and determined by the second consensus node.

In an embodiment, the first proposal digest carries the first transaction hash, and before the second proposal digest is generated, the consensus on the consensus proposal is not participated in if it is detected that the first transaction hash does not match the second transaction hash; and the step of generating the second proposal digest is continued if it is detected that the first transaction hash matches the second transaction hash.

In the above embodiments of the present specification, a function of reaching a consensus on a last block hash is introduced into a consensus protocol, so that a node can judge in time whether itself is forked or a node that initiates the consensus is forked, and decide whether to participate in the consensus, thereby ensuring that nodes participating in the consensus reach a consensus based on a consistent last block, and avoiding aggravating block forking.

Corresponding to the method embodiments illustrated in FIG. 1 or FIG. 2, a consensus system for a blockchain based on a Byzantine fault tolerance algorithm is further provided. The system includes: a first consensus node and a second consensus node.

The first consensus node is configured to initiate a consensus proposal including a first proposal digest generated based on a first last block hash maintained by the first consensus node.

The second consensus node is configured to respond to the consensus proposal and generate a second proposal digest based on a second last block hash maintained by the second consensus node; not participate in a consensus on the consensus proposal if it is detected that the first proposal digest does not match the second proposal digest; and otherwise, participate in the consensus on the consensus proposal.

The first last block hash and the second last block hash are hash values of the closest N blocks previous to the latest block in distributed ledgers maintained by the first consensus node and the second consensus node, respectively, and N is a positive integer.

In an embodiment, the first last block hash is a hash value of a previous block of the latest block in the distributed ledger maintained by the first consensus node; and the second last block hash is a hash value of a previous block of the latest block in the distributed ledger maintained by the second consensus node.

In an embodiment, the first proposal digest is generated based on the first last block hash and a first transaction hash of a transaction set needing to be proposed by the first consensus node.

In an embodiment, the consensus proposal further includes the transaction set needing to be proposed, and the second consensus node is configured to: generate the second proposal digest based on a second transaction hash of the transaction set in the consensus proposal and the second last block hash.

In an embodiment, the first transaction hash is a root hash value of a Merkel tree corresponding to the transaction set determined by the first consensus node; and the second transaction hash is a root hash value of a Merkel tree corresponding to a transaction set that is in the consensus proposal and determined by the second consensus node.

In an embodiment, the first proposal digest carries the first transaction hash, and before the second proposal digest is generated, the second consensus node does not participate in the consensus on the consensus proposal if it is detected that the first transaction hash does not match the second transaction hash; and the step of generating the second proposal digest is continued if it is detected that the first transaction hash matches the second transaction hash.

In an embodiment, the second consensus node participates in the consensus on the consensus proposal if it is detected that the first proposal digest matches the second proposal digest.

The interaction process between the first consensus node and the second consensus node of the system and the working principle thereof have been described in detail in the above method embodiments. In the system, a function of reaching a consensus on a last block hash is introduced into a consensus protocol, so that a node can judge in time whether itself is forked or a node that initiates the consensus is forked, and decide whether to participate in the consensus, thereby ensuring that nodes participating in the consensus reach a consensus based on a consistent last block, and avoiding aggravating block forking.

Figure 7:
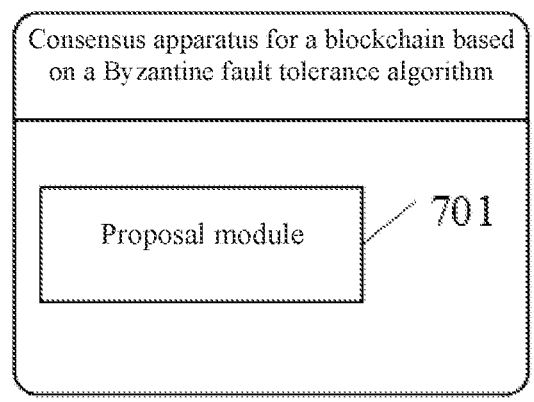
FIG. 7 is a schematic diagram of a consensus apparatus for a blockchain based on a Byzantine fault tolerance algorithm according to an embodiment.

FIG. 7 is a schematic diagram of a consensus apparatus for a blockchain based on a Byzantine fault tolerance algorithm according to an embodiment. Referring to FIG. 7, the apparatus may include a proposal module 701 configured to initiate a consensus proposal including a first proposal digest generated based on a first last block hash maintained by the first consensus node of a consortium blockchain. The first last block hash is hash values of the closest N blocks previous to the latest block in a distributed ledger maintained by the first consensus node, and N is a positive integer.

In an embodiment, the proposal module 701 includes: a first determination module configured to determine a transaction set needing to be proposed; a second determination module configured to determine a first last block hash maintained by the first consensus node, the first last block hash being hash values of the closest N blocks previous to the latest block in a distributed ledger maintained by the first consensus node, and N being a positive integer; and a processing module configured to, based on the transaction set and the first last block hash, generate a proposal digest and initiate a consensus proposal.

In an embodiment, the proposal module 701 includes: a third determination module configured to determine a transaction set needing to be proposed; a fourth determination module configured to determine a first last block hash maintained by the first consensus node, the first last block hash being hash values of the closest N blocks previous to the latest block in a distributed ledger maintained by the first consensus node, and N being a positive integer; and a processing module configured to generate a proposal digest based on the first last block hash, and initiate a consensus proposal based on the proposal digest and the transaction set.

In an embodiment, the first last block hash is a hash value of a previous block of the latest block in the distributed ledger maintained by the first consensus node.

In an embodiment, the first proposal digest is generated based on the first last block hash and a first transaction hash of a transaction set determined by the first consensus node.

In an embodiment, the consensus proposal further includes the transaction set needing to be proposed.

In an embodiment, the first transaction hash is a root hash value of a Merkel tree corresponding to the transaction set determined by the first consensus node.

Figure 8:
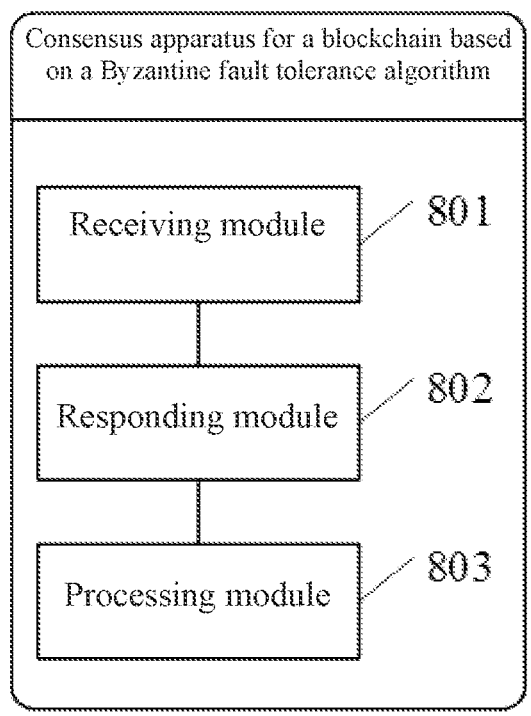
FIG. 8 is a schematic diagram of a consensus method for a blockchain based on a Byzantine fault tolerance algorithm according to an embodiment.

FIG. 8 is a schematic diagram of a consensus apparatus for a blockchain based on a Byzantine fault tolerance algorithm according to an embodiment. Referring to FIG. 8, the apparatus may include a receiving module 801, a responding module 802, and a processing module 803.

The receiving module 801 is configured to receive a consensus proposal initiated by a first consensus node of a consortium blockchain, the consensus proposal including a first proposal digest generated based on a first last block hash maintained by the first consensus node, the first last block hash being hash values of the closest N blocks previous to the latest block in a distributed ledger maintained by the first consensus node, and N being a positive integer.

The responding module 802 is configured to respond to the consensus proposal and generate a second proposal digest based on a second last block hash maintained by a second consensus node of the consortium blockchain, the second last block hash being hash values of the closest N blocks previous to the latest block in a distributed ledger maintained by the second consensus node, and N being a positive integer.

The processing module 803 is configured to not participate in a consensus on the consensus proposal if it is detected that the first proposal digest does not match the second proposal digest; and otherwise, participate in the consensus on the consensus proposal.

In an embodiment, the second last block hash is a hash value of a previous block of the latest block in a distributed ledger maintained by the second consensus node.

In an embodiment, the consensus proposal further includes the transaction set needing to be proposed, and responding module 802 is configured to generate the second proposal digest based on a second transaction hash of the transaction set in the consensus proposal and the second last block hash.

In an embodiment, the second transaction hash is a root hash value of a Merkel tree corresponding to a transaction set that is in the consensus proposal and determined by the second consensus node.

In an embodiment, the first proposal digest carries the first transaction hash, and responding module 802 does not participate in the consensus on the consensus proposal if it is detected that the first transaction hash does not match the second transaction hash; and the step of generating the second proposal digest is continued if it is detected that the first transaction hash matches the second transaction hash.

In an embodiment, processing module 803 participates in the consensus on the consensus proposal if it is detected that the first proposal digest matches the second proposal digest.

The apparatus embodiments corresponding to FIG. 7 and FIG. 8 are similar to the above method embodiments, and related content thereof has been described in detail in the method embodiments. In the system, a function of reaching a consensus on a last block hash is introduced into a consensus protocol, so that a node can judge in time whether itself is forked or a node that initiates the consensus is forked, and decide whether to participate in the consensus, thereby ensuring that nodes participating in the consensus reach a consensus based on a consistent last block, and avoiding aggravating block forking. In addition, it should be noted that among the components of the apparatus of the present specification, the components are logically divided according to the functions to be implemented by the components, but the present specification is not limited thereto, and the components may be redivided or combined as required.

Figure 9:
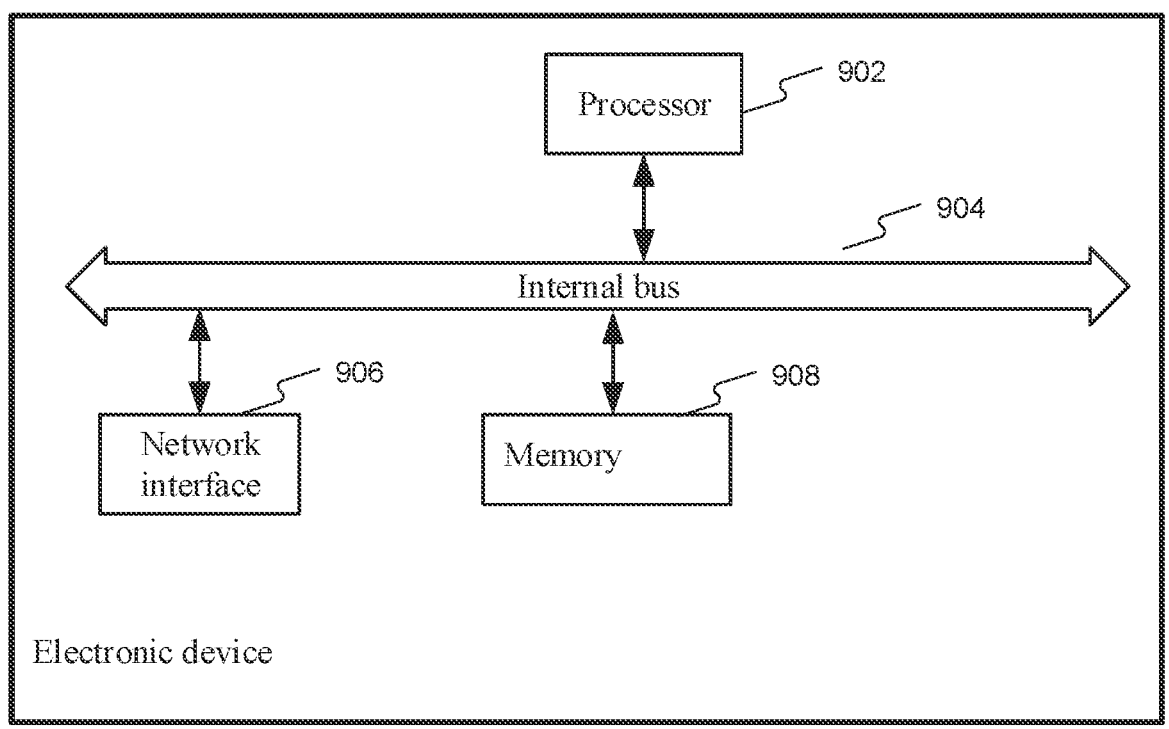
FIG. 9 is a schematic diagram of an electronic device according to an embodiment.

FIG. 9 is a schematic diagram of an electronic device according to an embodiment. For example, the electronic device may operate as a consensus apparatus, such as any of the first consensus node or the second consensus node described above. Referring to FIG. 9, the electronic device includes a processor 902, an internal bus 904, a network interface 906, and a memory 908, such as a volatile memory or a non-volatile memory. The electronic device may further include hardware necessary to other services. The processor 902 reads a corresponding computer program from the non-volatile memory, loads the computer program to the internal memory, and then runs the computer program to operate as a consensus apparatus for a blockchain based on a Byzantine fault tolerance algorithm. In addition to the software implementation, the electronic device can also have other implementations, such as a logical device or a combination of hardware and software. For example, an entity for performing the processing procedure is not limited to the logical units, but may also be hardware or a logical device.

The network interface 906, the processor 902, and the memory 908 may be connected to each other by using the bus 904. The bus 904 may be an Industry Standard Architecture (ISA) bus, a Peripheral Component Interconnect (PCI) bus, an Extended Industry Standard Architecture (EISA) bus, or the like. The bus 904 may be classified into an address bus, a data bus, a control bus, and the like. For ease of representation, the bus 904 is represented by a double-sided arrow in FIG. 9, but it does not mean that there is only one bus or one type of bus.

The memory 908 is configured to store computer instructions. The memory 908 may include a read-only memory and a random access memory, and provides instructions and data to the processor. The memory 908 may include a high-speed random access memory (RAM), and may also include a non-volatile memory, such as at least one disk memory.

The processor 902 is configured to execute the instructions stored in the memory to perform the above described methods. For example, the method includes: initiating, by a first consensus node of a consortium blockchain, a consensus proposal including a first proposal digest generated based on a first last block hash maintained by the first consensus node, wherein the first last block hash is hash values of the closest N blocks previous to the latest block in a distributed ledger maintained by the first consensus node, and N is a positive integer. Also for example, the method includes: receiving, by a second consensus node of a consortium blockchain, a consensus proposal initiated by a first consensus node of the consortium blockchain, the consensus proposal including a first proposal digest generated based on a first last block hash maintained by the first consensus node, the first last block hash being hash values of the closest N blocks previous to the latest block in a distributed ledger maintained by the first consensus node, and N being a positive integer; in response to the consensus proposal, generating a second proposal digest based on a second last block hash maintained by the second consensus node, the second last block hash being hash values of the closest N blocks previous to the latest block in a distributed ledger maintained by the second consensus node, and N being a positive integer; and not participating in a consensus on the consensus proposal if it is detected that the first proposal digest does not match the second proposal digest; and otherwise, participating in the consensus on the consensus proposal.

In an embodiment, the processor 902 may be an integrated circuit chip and have a signal processing capability. In an implementation process, the steps of the foregoing method may be implemented by using a hardware integrated logic circuit in the processor or instructions in the form of software. The processor 902 may be a general-purpose processor, including a Central Processing Unit (CPU), a Network Processor (NP), and the like; or may be a Digital Signal Processor (DSP), an Application Specific Integrated Circuit (ASIC), a Field-Programmable Gate Array (FPGA), or another programmable logic device, discrete gate or transistor logic device, or discrete hardware component. The methods, steps, and logical block diagrams disclosed in the embodiments of the present specification may be implemented or performed. The general-purpose processor may be a microprocessor, or the processor may be any conventional processor or the like. The steps in the methods disclosed in the embodiments of the present specification may be directly implemented by a hardware decoding processor, or may be implemented by a combination of hardware and software modules in a decoding processor. The software module may be located in a storage medium, such as a random-access memory, a flash memory, a read-only memory, a programmable read-only memory, an electrically erasable programmable memory, or a register. The storage medium is located in the memory. The processor reads information in the memory, and completes the steps of the method by using hardware thereof.

In an embodiment, the electronic device operating as the consensus apparatus may further perform the above described methods as a master node.

A non-transitory computer-readable storage medium is further provided in the embodiments of the present specification. The computer-readable storage medium stores instructions that, when executed by a processor of an electronic device, cause the electronic device to perform the above consensus methods for a blockchain based on a Byzantine fault tolerance algorithm.

The foregoing describes example embodiments of the present specification. Other embodiments may fall within the scope of the appended claims. In some cases, the actions or steps may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

Those skilled in the art should understand that the embodiments of the present specification may be provided as a method, a system, or a computer program product. Moreover, the present specification may be in the form of a computer program product that is implemented on one or more computer-usable storage media (including, but not limited to, a disk memory, a CD-ROM, an optical memory, and the like) including computer-usable program code.

The present specification is described with reference to flowcharts and/or block diagrams of the method, device (system), and computer program product of the embodiments of the present specification. It should be understood that each flow and/or block in the flowcharts and/or block diagrams and a combination of flows and/or blocks in the flowcharts and/or block diagrams may be implemented by computer program instructions. These computer program instructions can be provided to a processor of a general-purpose computer, a special-purpose computer, an embedded processor, or another programmable data processing device to produce a machine, so that the instructions executed by the processor of the computer or another programmable data processing device produce an apparatus for realizing the functions specified in one or more flows of the flowcharts and/or one or more blocks of the block diagrams.

These computer program instructions may also be stored in a computer-readable memory that can direct a computer or another programmable data processing device to work in a specific manner, so that the instructions stored in this computer-readable memory produce an article of manufacture including an instruction apparatus which implements the functions specified in one or more flows of the flowcharts and/or one or more blocks of the block diagrams.

These computer program instructions can also be loaded onto a computer or another programmable data processing device, so that a series of operation steps are performed on the computer or another programmable device to produce computer-implemented processing, so that the instructions executed on the computer or another programmable device provide steps for implementing the functions specified in one or more flows of the flowcharts and/or one or more blocks of the block diagrams.

In an embodiment, the electronic device includes one or more central processing units (CPUs), an input/output interface, a network interface, and a memory.

The memory may include a volatile memory, a RAM, and/or a non-volatile memory in computer-readable media, e.g., a ROM or a flash RAM. The memory is an example of the computer-readable medium.

The computer-readable medium includes permanent and non-permanent, removable and non-removable media, which may implement storage of information by using any method or technology. The information may be a computer readable instruction, a data structure, a module of a program, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device, or any other non-transmission media, which may be configured to store information accessible by a computing device. As defined herein, the computer-readable medium does not include transitory computer readable media (transitory media), such as a modulated data signal and a carrier.

The foregoing describes example embodiments of the present specification and are not intended to limit the present specification. For those skilled in the art, the present specification may have various alterations and changes. Any modification, equivalent replacement, improvement, and the like made within the spirit and principle of the present specification are included in the scope of the claims of the present specification.

The invention claimed is:

1. A consensus method for a blockchain based on a Byzantine fault tolerance algorithm, comprising:
   determining, by a first consensus node of a consortium blockchain, a first last block hash comprising one or more hash values of one or more blocks previous and closest to a latest block in a distributed ledger maintained by the first consensus node;
   generating, by the first consensus node of the consortium blockchain, a first proposal digest based on the first last block hash and a first transaction hash of a transaction set needing to be proposed by the first consensus node;
   initiating, by the first consensus node of the consortium blockchain, a consensus proposal comprising the transaction set needing to be proposed and the first proposal digest;
   transmitting, by the first consensus node of the consortium blockchain, the consensus proposal to a second consensus node of the consortium blockchain;
   in response to the second consensus node of the consortium blockchain receiving the consensus proposal;
   determining, by the second consensus node of the consortium blockchain, a second last block hash comprising one or more hash values of one or more blocks previous and closest to a latest block in a distributed ledger maintained by the second consensus node;
   generating, by the second consensus node of the consortium blockchain, a second proposal digest based on the second last block hash by:
      determining, in the consensus proposal from the first consensus node, the transaction set needing to be proposed; and
      generating the second proposal digest based on a second transaction hash of the transaction set determined in the consensus proposal and the second last block hash;
   determining, by the second consensus node, whether one of the first consensus node or the second consensus node is forked, by detecting whether there is a mismatch between the first proposal digest and the second proposal digest; and
   participating in, by the second consensus node, a consensus on the consensus proposal if it is determined that the first consensus node and the second consensus node are not forked by detecting that the first proposal digest matches the second proposal digest, and not participating in, by the second consensus node, the consensus on the consensus proposal if it is determined that one of the first consensus node or the second consensus node is forked by detecting that the first proposal digest does not match the second proposal digest.

2. The method according to claim 1, wherein:
the first last block hash is a hash value of a previous block of the latest block in the distributed ledger maintained by the first consensus node; and
the second last block hash is a hash value of a previous block of the latest block in the distributed ledger maintained by the second consensus node.

3. The method according to claim 1, wherein:
the first transaction hash is a root hash value of a Merkel tree corresponding to the transaction set determined by the first consensus node; and
the second transaction hash is a root hash value of a Merkel tree corresponding to a transaction set that is in the consensus proposal and determined by the second consensus node.

4. A system for a consortium blockchain based on a Byzantine fault tolerance algorithm, the system comprising:
a first electronic device operating as a first consensus node of the consortium blockchain and comprising:
a first processor; and
a first memory storing instructions that, when executed by the first processor, cause the first processor to perform operations of:
determining a first last block hash comprising one or more hash values of one or more blocks previous and closest to a latest block in a distributed ledger maintained by the first consensus node;
generating a first proposal digest based on the first last block hash and a first transaction hash of a transaction set needing to be proposed by the first consensus node;
initiating a consensus proposal comprising the transaction set needing to be proposed and the first proposal digest; and
transmitting the consensus proposal to a second consensus node of the consortium blockchain;
a second electronic device operating as the second consensus node of the consortium blockchain and comprising:
a second processor; and
a second memory storing instructions that, when executed by the second processor, cause the second processor to perform operations of:
in response to receiving the consensus proposal from the first consensus node of the consortium blockchain:
determining a second last block hash comprising one or more hash values of one or more blocks previous and closest to a latest block in a distributed ledger maintained by the second consensus node;
generating a second proposal digest based on the second last block hash by:
determining, in the consensus proposal from the first consensus node, the transaction set needing to be proposed; and
generating the second proposal digest based on a second transaction hash of the transaction set determined in the consensus proposal and the second last block hash;
determining whether one of the first consensus node or the second consensus node is forked, by detecting whether there is a mismatch between the first proposal digest and the second proposal digest; and
participating in a consensus on the consensus proposal if it is determined that the first consensus node and the second consensus node are not forked by detecting that the first proposal digest matches the second proposal digest, and not participating in the consensus on the consensus proposal if it is determined that one of the first consensus node or the second consensus node is forked by detecting that the first proposal digest does not match the second proposal digest.

5. The system according to claim 4, wherein:
the first last block hash is a hash value of a previous block of the latest block in the distributed ledger maintained by the first consensus node; and
the second last block hash is a hash value of a previous block of the latest block in the distributed ledger maintained by the second consensus node.

6. The system according to claim 4, wherein:
the first transaction hash is a root hash value of a Merkel tree corresponding to the transaction set determined by the first consensus node; and
the second transaction hash is a root hash value of a Merkel tree corresponding to a transaction set that is in the consensus proposal and determined by the second consensus node.

* * * * *

UNITED STATES PATENT AND TRADEMARK OFFICE
CERTIFICATE OF CORRECTION

PATENT NO. : 11,874,820 B2
APPLICATION NO. : 17/354101
DATED : January 16, 2024
INVENTOR(S) : Xiaojun Liao It is certified that error appears in the above-identified patent and that said Letters Patent is hereby corrected as shown below:

In the Claims

Claim 1, Column 18, Lines 36-37:
"in response to the second consensus node of the consortium blockchain receiving the consensus proposal;"

Should read:
--in response to the second consensus node of the consortium blockchain receiving the consensus proposal:--.

Signed and Sealed this
Fourteenth Day of May, 2024

Katherine Kelly Vidal
*Director of the United States Patent and Trademark Office*